June 18, 1929.   P. LOFY   1,717,886
BRAZING MACHINE
Filed Sept. 26, 1927   3 Sheets-Sheet 3
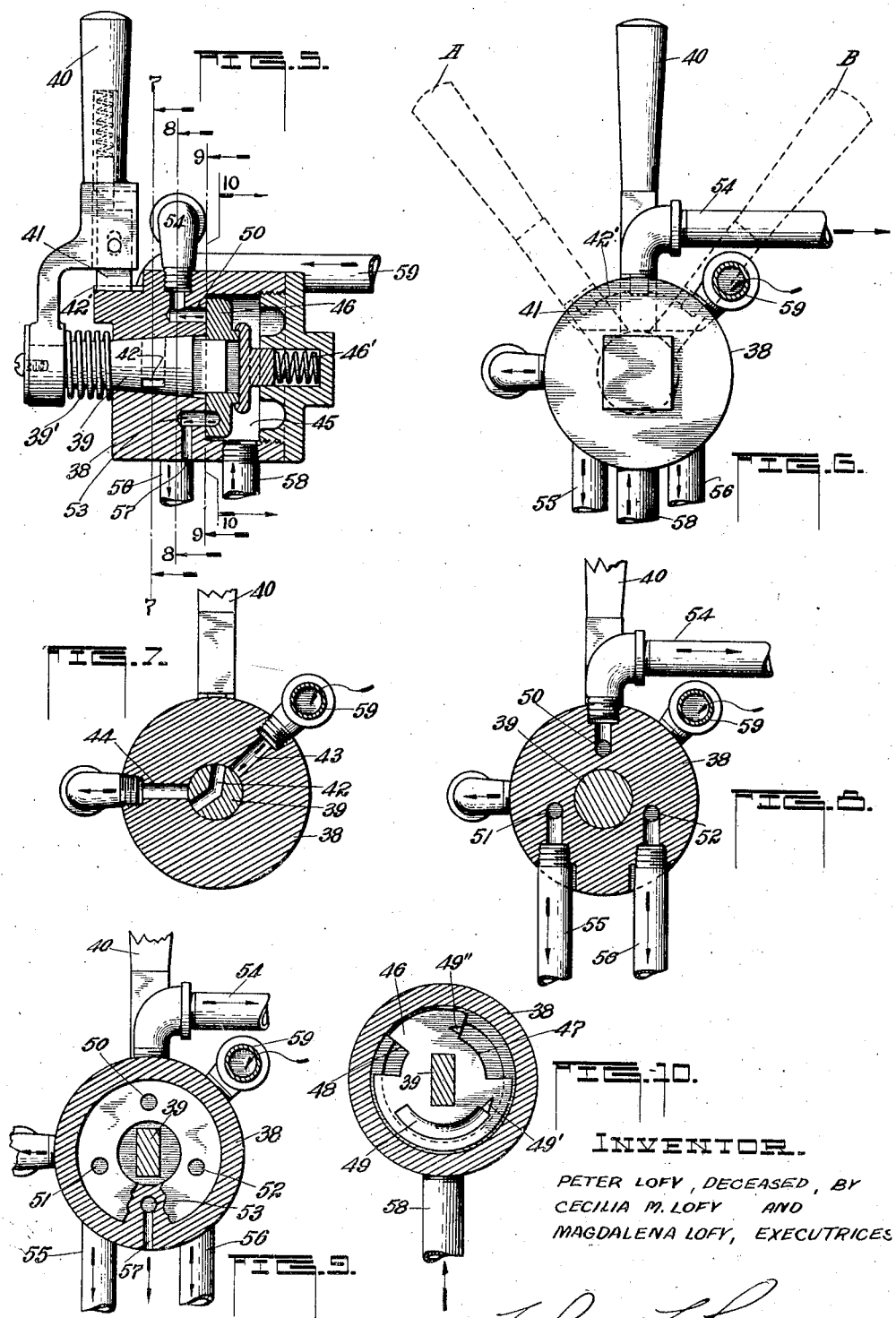

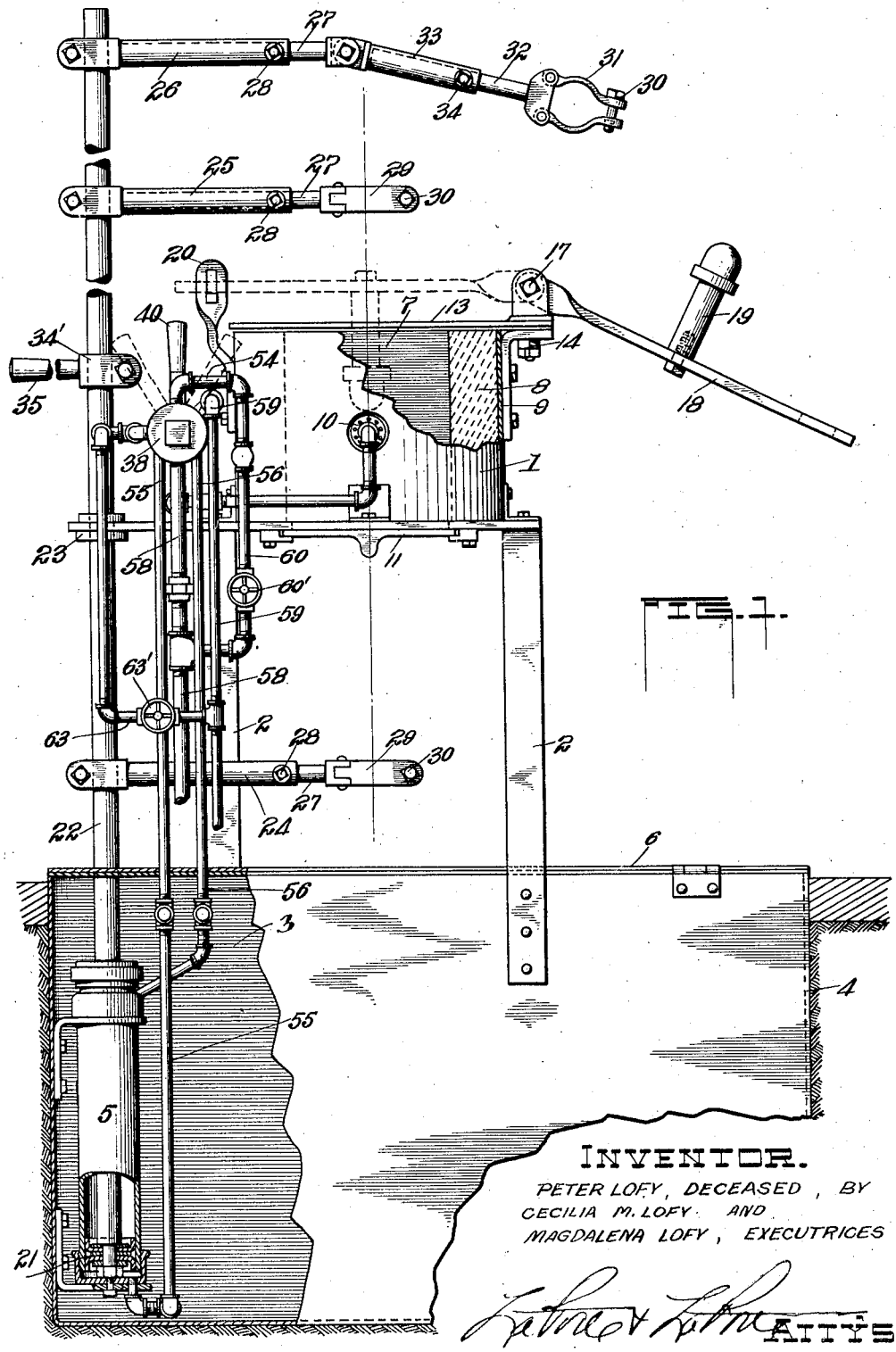

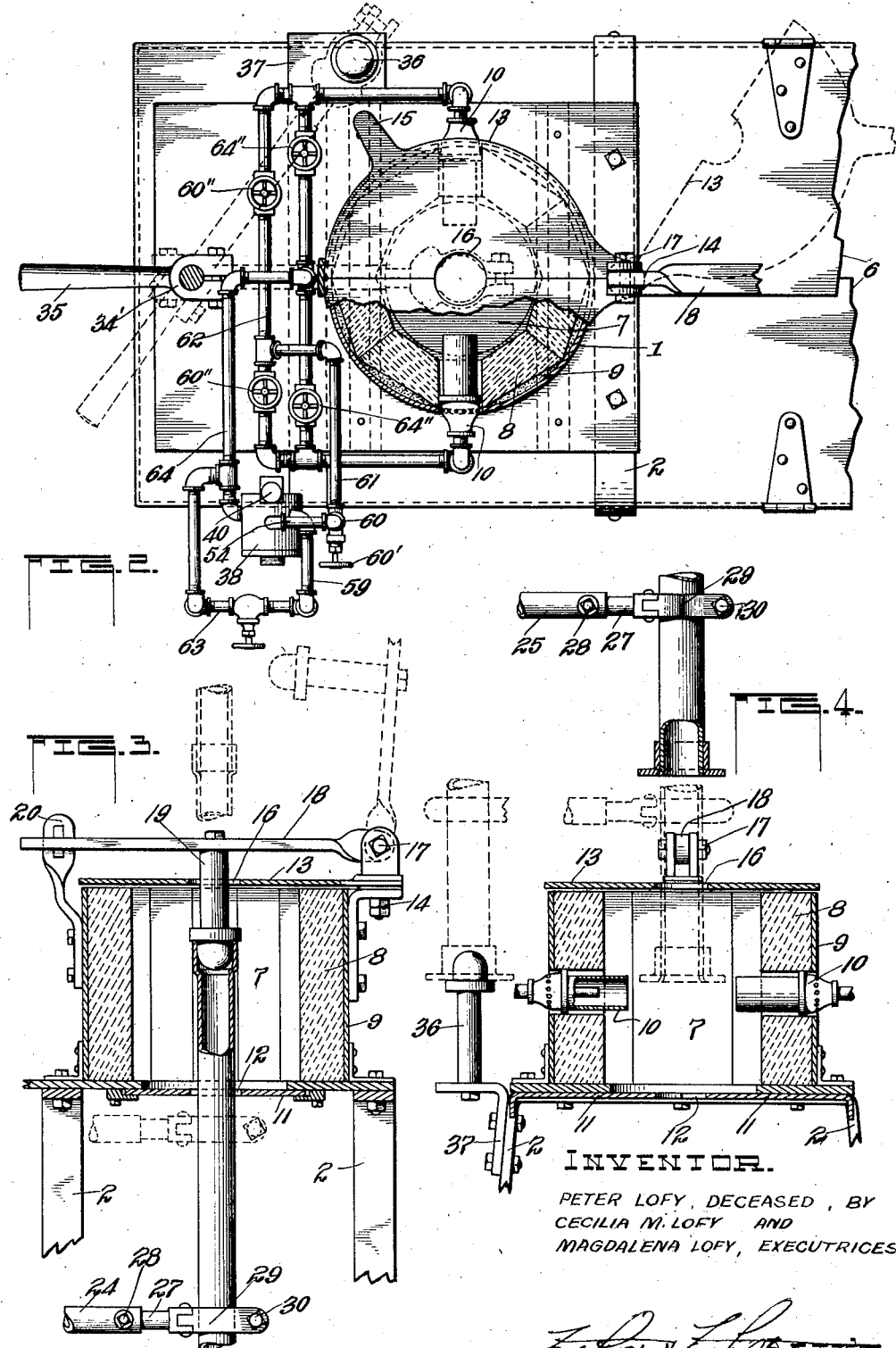

Patented June 18, 1929.

1,717,886

UNITED STATES PATENT OFFICE.

PETER LOFY, DECEASED, LATE OF DECATUR, ILLINOIS, BY CECILIA M. LOFY AND MAGDALENA LOFY, EXECUTRICES, OF SPRINGFIELD, ILLINOIS.

BRAZING MACHINE.

Application filed September 26, 1927. Serial No. 222,115.

This invention has reference to furnaces and it relates particularly to a furnace used for brazing materials, such for instance as one pipe section to another or for brazing to pipe sections couplings and the like.

The invention has for its principal object to provide a brazing furnace having burners of the Bunsen type and employing fuel oil as the heating medium and to associate with said furnace, guiding and supporting means for pipe sections which are to be brazed together, or a pipe section to which it is intended to braze a coupling or the like, and furthermore to employ pneumatic actuated means for positioning such pipe sections and for removing and replacing the said pipe sections for the application of the heat of said burners thereto.

The invention has for a further object to provide in connection with a brazing furnace, gauge members for determining the initial position and aligning said pipe section or sections in relation to the burners and the application of the heat to such section or sections.

A further object of the invention is to provide in connection with the burners of a brazing furnace, fuel and air supply means and a pneumatically operable piston for movement of the material being worked upon in relation to said burners, such control means being capable of shutting off the supply of fuel to the burners in the application of the air to move said pneumatically operated piston in one direction.

Other and further objects will more fully appear in a description of the furnace.

That the invention may be more fully understood, reference is had to the accompanying drawings forming a part of the description and illustrating a preferred embodiment of the invention, in which:—

Fig. 1 is a side elevation partly broken away and partly in section showing a brazing furnace embodying the invention;

Fig. 2 is a plan view partially broken away and partially in section, of Fig. 1;

Fig. 3 is a detail vertical sectional view of the furnace showing the operative position of one gauge member for positioning and aligning a pipe section to the burners of the furnace;

Fig. 4 is a view similar to Fig. 3, except transverse thereto, and shows a gauge member for properly positioning a pipe section to which it is intended to braze a coupling or like member for its subsequent application to the furnace and the burners thereof whereby to apply the heat from said burners for brazing the coupling or like member to the pipe section;

Fig. 5 is an enlarged vertical sectional view of the valve controlling means for the fuel and air;

Fig. 6 is a front elevation of the structure shown in Fig. 5 with the valve controlling lever shown in full lines in neutral position and in dotted lines in different operative positions;

Fig. 7 is a detailed cross section as the same would appear if taken on the line 7—7, Fig. 5, looking in the direction of the arrows on said figure;

Fig. 8 is a detailed cross section as the same would appear if taken on the line 8—8, Fig. 5, looking in the direction of the arrows on said figure;

Fig. 9 is a detailed cross section as the same would appear if taken on the line 9—9, Fig. 5, looking in the direction of the arrows on said figure, and Fig. 10 is a cross section as the same would appear if taken on the line 10—10, Fig. 5, looking in the direction of the arrows on said figure.

Like characters of reference denote corresponding parts throughout the figures.

In the drawings 1 designates a brazing furnace supported by suitable standards 2 from a housing or casing 3 located within a pit 4, said housing or casing adapted to contain a preferably vertically disposed air cylinder 5 and having hinged cover plates 6.

The furnace 1 is preferably cylindrical in cross section having a fire box or combustion chamber 7 which is lined with suitable refractories 8 and encased within a cylindrical casing 9. Disposed through the furnace in preferably diametrically opposed positions, are burners 10, preferably of the Bunsen type. The bottom of the furnace is provided with the opposed slidable plates 11 having matching cut out portions 12 adapted to embrace a pipe section passed up through the bottom of the furnace, and the top of the furnace is provided with cover plates 13 pivoted at one side 14 and having hand holds 15 by means of which said cover plate sections may be moved to closed and open positions and the matching portions of said cover plates have corresponding cut out portions 16 to embrace a pipe section held therebetween. The cut out portions 12 of the plates 11 and the cut out portions 16 of the plates 13 are axially disposed in relation to the axis of the furnace.

Hinged at 17 to one side of the furnace and adapted to be swung thereacross over the top thereof, is a bar 18 which carries a gauge member 19. This gauge member, when the bar is swung across the furnace into operative position, is disposed vertically and axially within the furnace and between the cut out portions 16 of the cover plate sections 13, as is best seen in Fig. 3, the free end of said support bar 18 resting upon the support 20. This gauge member may be of any suitable contour or design, but it is preferred that its active end may be such as to fit within the swaged end of a pipe section to which another pipe section is to be brazed and the normal operative position of said gauge is such as it will position the swaged end of such a pipe section in relation to the burners 10 so that when lit, the flame from such burners will be directed upon such swaged portion of such a pipe section. After positioning and aligning of a pipe section, as best seen in Fig. 3, the support 18 with the gauge thereon may be swung upwardly and outwardly into the position in which it is shown in full lines in Fig. 1. The function of the gauge member above described is primarily to position and align the pipe section which is passed up through the bottom of the furnace and supported in this position for the brazing thereto of another pipe section.

The air cylinder 5, to which reference has been previously made, is best seen in Fig. 1 and is suitably supported in its vertical position from a wall of the housing or casing 3 and within said cylinder is reciprocally arranged a piston 21 to which is operatively connected an elongated piston rod or bar 22 which passes out of the upper end of the cylinder and through the top of the housing or casing 3 and up to a suitable point about the top of the furnace and guided by means of a guiding member 23 suitably supported from the furnace or its supports. To this piston rod or bar 22 is clamped a series of transversely supported tubular members 24, 25 and 26 in superimposed relation and it is provided that such members may be adjusted axially of and on the piston rod or bar 22, as will be understood. Telescopically connected with the members 24, 25 and 26 are rods 27 adapted to be fixed in adjusted positions in relation to their respective members by means of the set screws 28. The rods 27 of the members 24 and 25 have connected thereto hinged clamps 29 with securing means 30 for locking said clamps about sections of pipe. In the normal operative and supporting positions of said clamps 29 they are disposed axially below and above the furnace, as best seen in Fig. 1. These clamps 29 are designed for supporting vertical sections of pipe. Should the section supported by the clamp 29 of the member 25 extend above with a curved portion in its length an additional support for such curved portion of the section of the pipe is provided. This is in the form of a clamp 31 similar in all respects to the clamps 29 and carried by a rod 32 having a telescopic connection with a tubular member 33 with means 34 for securing the rod 32 in adjusted positions and said tubular member 33 has a vertical connection with the end of the rod 27 telescopically carried in the tubular member 26. The clamps 29 and 31 as will be understood may be extended or retracted in relation to their tubular members and are also capable of being turned in relation to their supports and are locked in these chance adjusted positions.

The piston rod or bar 22 while it is capable of axial movement by the application of air to the piston 21 at the upper and lower ends of the cylinder 5 is also capable of being manually turned on its axis for the purpose of swinging the clamps 29 into axial positions in relation to the furnace and away therefrom. This is accomplished through and by means of a clamp 34' secured to the piston rod or bar 22, said clamp being provided with or having connected thereto a hand lever 35.

In addition to the gauge 19, previously referred to, the apparatus is provided with another gauge 36 which may be in all respects similar to the gauge 19 or differ in design therefrom as occasion may require, and said gauge 36 is disposed in a permanent vertical position from a support 37 connected with the furnace or supports thereof. The function of this last mentioned gauge is for initially determining the location of the end of a pipe section to which it is desired to braze a coupling or similar member, and to accomplish this function a pipe section would be clamped within the clamp 29 of the tubular member 25 and the attendant would, by the lever 35, swing such clamp with its pipe section end thereby to a position above the gauge 36 and the pipe with its coupling to be attached thereto positioned somewhat as shown in the dotted line in Fig. 4, in which position the piston 21 would be at its lowest level in the cylinder 5. Then by operating the piston the pipe section could be elevated, swung into position and lowered with the coupling attached thereto within the furnace into proper position between the burners for the application of heat thereto, it being understood that the normal position of the active end of the gauge 36 is the normal position of the pipe section with the coupling thereon within the furnace in position between the burners. It will be further understood that on applying a coupling to the end of a pipe section that the end of the pipe section within the coupling would be swaged, as shown in full dotted lines in Fig. 4 so as to hold the flux and spelter when applied thereto.

38 designates a valve casing in which is journaled for oscillation a valve stem 39 to which is connected a hand lever 40 having a spring held detent or dog 41 adapted to have yielding and locking engagement with a tooth segment 42′ on the surface of said valve casing. This valve stem is provided within the casing with a sinuous fuel duct 42 adapted in a certain position of the valve stem 39 to have coincidence with fuel inlet and outlet ducts 43 and 44 respectively in said casing, see Fig. 7. The said casing 38 is formed or provided with an air receiving chamber 45 in which is arranged a valve member 46 operatively connected to the inner end of the valve stem 39. The active face of this valve member lies in juxtaposition to a wall of the casing and is adapted to have oscillatory movement thereagainst in common with the movement of the valve stem 39 and said valve member has preferably the design shown in Fig. 10 wherein it is shown provided with the cut out portions 47 and 48 and the duct 49 and with the preferably V-shaped escapement notches 49′ and 49″. The casing is provided with a plurality of air ducts 50, 51, 52 and 53. The duct 50 is normally in communication with an air conducting pipe 54 which is in communication with piping leading to the burners. The duct 51 is normally in communication with an air conducting pipe 55 which leads to the lower end of the casing 5. The air duct 52 is normally in communication with an air conducting pipe 56 which leads to the upper end of the casing 5, and the duct 53 is normally in communication with a duct 57 in the casing 38 and which serves as the exhaust through the casing in a manner which will be described. The main air supply to the chamber 45 of the casing 38 is conducted through the air supply pipe 58 and fuel is supplied to the apparatus and through the casing 38 through a fuel supply pipe 59. Pipe connections between the burners of the furnace and the air and fuel supply pipes comprise an air conducting pipe 60 coupled to the main air feed pipe 58 to which is coupled a pipe 61 in turn suitably coupled to a pipe 62 which has connection with the burners, in the manner seen in Fig. 2. Coupled to the fuel supply pipe 59 is a pipe 63 which in turn is connected with a pipe 64 which is coupled into and with the feeders 62 of the air supply pipes for conducting the fuel to the burners. The pipe 60 is provided with a controlling valve 60′ and the pipe 62 is provided with controlling valves 60″. The pipe 63 is provided with a controlling valve 63′ and the pipe 61 is provided with controlling valves 64″. The active face of the valve member 46 is held in juxtaposition to the wall of the casing 38 by means of the spring 46′; and the valve stem 39 is retained in the journal of the casing by means of the spring member 39′, see Fig. 5.

The air supply pipe 60 and the fuel supply pipe 63 are what may be considered auxiliary piping and are primarily used for initially starting the furnace, when the furnace is cold, and after the temperature has been raised in the furnace due to the application of heat therein, the supply of air and fuel through these respective pipes may be discontinued by closing the valves 60′ and 63′ respectively, and by regulating the valves 60″ and 64″ respectively, the amount of air and fuel inducted into the furnace may be regulated.

For the purpose of starting the furnace when cold and before the induction to the burners of the air and fuel, which, as will be understood, is fed in proper proportions, oil waste may be dropped into the furnace and lighted for the purpose of igniting the burners on the introduction of fuel and air thereto.

Assuming that the burners are in operation and pipe sections have been secured in position and supported by the piston rod or bar 22 and it is desired to move the same vertically through the reciprocation of the piston 21, the attendant, on moving the lever 40 to its dotted line position A in Fig. 6, the valve member 46 will be moved to bring the cut out portion 47 thereof in coincidence with the duct 51 in the casing so that the air admitted through the pipe 58 and into the chamber 45 will pass out of the casing and down through the pipe 55 to the lower end of the cylinder 5 where it will act on the piston 21 and elevate it and the piston rod or bar 22 in parts connected thereto. Air exhausting from the cylinder 5 above the piston will pass up through the pipe 56 and into the duct 52 in the casing and have communication with the duct 49 and through such duct the air will be permitted to exhaust from the casing through the ducts 53 and 57. To lower the piston rod or bar 22 and parts connected thereto, the attendant will move the lever 40 to the dotted line position B in Fig. 6 which will cause the cut out portion 48 of the valve 46 to be brought into coincidence with the duct 52 in the casing and from thence the air will be conducted through the pipe 56 to the upper end of the cylinder 5 where it will act upon the piston forcing it downwardly in said casing 5 and air exhausting from below the piston will pass up through the pipe 55 and thence through the duct 51 and through the duct 49 and out through the casing through the ducts 53 and 57 respectively. Simultaneously with the downward movement of the piston and when the cut out portion 47 of the valve 46 is coincident with the duct 51, the duct 42 in the valve stem 39 is caused to register with the intake discharge fuel ducts 43 and 44 so that fuel shall be conducted from the fuel supply pipe 59 to the pipe which will conduct such fuel to the burners; also at the same time the valve 46 will so register with the duct 50 in the casing that air may be conducted from the pipe 58 through the chamber 45 and thence to the main air supply pipe 54 in communication with the burners. Returning the lever 40 from either of the positions A and B in Fig. 6 to the full line position in such figure as should be apparent, will cause a non-registering of the valve member with the ducts in the casing so that no air or fuel will be conducted through and in such position the fuel duct 42 in the valve stem 39 will be caused to assume the non-registering and non-operating position as shown in Fig. 7.

In the operation of brazing two sections of pipe together, the upper and lower sections are brought into registering position in the manner described and after the ends to be united have been brought to the proper temperature by the application of heat thereto, they are elevated by the operation of the piston rod or bar 22 so as to bring the registering ends of the pipe sections into somewhat the position shown by the dotted lines in Fig. 3 in which position and at which time a suitable flux is applied thereto, as is well known in the practice, and the said registering ends of the pipe sections again returned to the furnace through the downward reciprocation of the piston rod or bar 22 when they are reheated and then again lifted for the application of a suitable spelter thereto and again returned to the furnace for reheating and for brazing of the said sections together. With each operation of raising the pipe sections through the upper reciprocation of the piston rod or bar 22, the supply of fuel and air to the burners is discontinued for the ease and convenience of the attendant in applying the flux and spelter and to avoid his coming into contact with the excessive heat from the burners, and then by the return of the registering ends of the said sections of pipe to the burners through the lowering of the piston rod of bar 22, the supply of fuel and air is again automatically turned on. The operation just described is carried on in a similar manner, as will be understood, when it is desired to braze a coupling or similar member to the end of a pipe section as has been previously indicated and as shown in Fig. 4.

It has been found in the use of this furnace that it is more efficient and a better brazing of pipe sections or couplings to such sections have been obtained than devices for this purpose known to trade and especially those using acetylene torch, having for its particular advantage the vertical positioning of the elements to be brazed making it possible for a better application of the flux and the spelter thereto and the subsequent brazing of the elements to be brazed.

What is claimed is:

1. In an apparatus of the character described, in combination, a furnace provided with burners, a manually controlled valved air and fuel distributing means, air and fuel supply means connected with said distributing means, air and fuel conducting means between said burners and said distributing means, a reciprocal work supporting member, a convertible air supply and discharge means between said distributing means and said work supporting member; the operation of the valved distributing means whereby air and fuel are conducted to said reciprocal means, in one direction, adapted to automatically shut off the distribution of air and fuel to said burners and thereby causing the cessation of said burners.

2. In an apparatus of the character described, in combination, a furnace provided with oppositely placed liquid fuel burners, a manually controlled valved air and fuel distributing means, air and fuel supply means connected with said distributing means, air and fuel conducting means between said burners and said distributing means, a reciprocal work supporting member, air actuated means for reciprocating said supporting means, a convertible air conducting and discharge means between said distributing means and said actuating means; the operation of the valved distributing means whereby to move said reciprocal work supporting means in one direction, automatically shutting off the distribution of air or fuel to said burners and thereby causing the cessation of said burners.

3. In an apparatus of the character described, in combination, a furnace including a central heating chamber and oppositely located burners therein, work guiding closures for opposite ends of said furnace chamber, a work positioning and aligning gauge movably connected with said furnace, a work supported means movable in relation to said furnace, air controlled means for actuating said work supporting means, and means for supplying fuel to said burners.

4. In an apparatus of the character described, in combination, a furnace including an annular heating chamber open at both ends and provided with burners therein, movable work guiding closures for work positioned axially of and within said heating chamber, a movable gauge for positioning and aligning the work within said heating chamber with respect to said burners, a work supporting means movable in relation to said furnace, means for pneumatically operating said work supporting means, and means for supplying fuel to said burners and for controlling such fuel supply.

5. In an apparatus of the character described, in combination, a furnace having a heating chamber open at opposite ends and provided with burners therein, gauge means for determining the position of work within said heating chamber and the relation of such work to said burners when placing the work within such chamber, a movable work supporting means, air supply and distributing means for moving said work supporting means, fuel supply and distributing means for said burners, and manual control means for regulating both said air and fuel supply means.

6. In a machine for brazing pipe sections or couplings to such sections, the combination of a heating furnace having burners located therein for the disposition of work therebetween, a gauge movably supported on said furnace and a gauge having a fixed position in relation to said furnace, each adapted for determining the position of the work in relation to the burners when placed within the furnace, pipe supporting means movable in relation to said furnace, pneumatic means to move said work supported means, means to supply fuel to said burners, and a manual control for said pneumatic means and for said fuel supply means.

7. In a machine for brazing pipe sections or couplings to such sections, the combination of a furnace having a vertically disposed heating chamber open top and bottom and provided with opposed burners in its wall for the location of the work axially of the heating chamber and between said burners, movable closures for the ends of said chamber, gauges for determining the position of the work within said chamber and in relation to said burners, a cylinder, a piston rod reciprocal in said cylinder, adjustable pipe supporting means connected with said piston rod, air supply and discharge means connected with said cylinder, fuel supply means connected with said burners, and manually operable means for controlling the air supply to said cylinder and for controlling the fuel supply to said burners.

In testimony whereof we affix our signatures.

CECILIA M. LOFY,
MAGDALENA LOFY,
*Executrices of the Estate of Peter Lofy.*